(12) United States Patent
Yang

(10) Patent No.: US 10,979,421 B2
(45) Date of Patent: Apr. 13, 2021

(54) IDENTITY AUTHENTICATION USING A BARCODE

(71) Applicant: Chien-Kang Yang, Taipei (TW)

(72) Inventor: Chien-Kang Yang, Taipei (TW)

(*) Notice: Subject to any disclaimer, the term of this patent is extended or adjusted under 35 U.S.C. 154(b) by 278 days.

(21) Appl. No.: 15/920,313

(22) Filed: Mar. 13, 2018

(65) Prior Publication Data

US 2018/0288037 A1    Oct. 4, 2018

(30) Foreign Application Priority Data

Mar. 29, 2017    (TW) .................................. 106110440

(51) Int. Cl.
| | |
|---|---|
| *H04L 29/06* | (2006.01) |
| *G06K 19/06* | (2006.01) |
| *G06F 21/35* | (2013.01) |
| *G06K 7/10* | (2006.01) |

(52) U.S. Cl.
CPC .......... *H04L 63/0853* (2013.01); *G06F 21/35* (2013.01); *G06K 7/1095* (2013.01); *G06K 7/10712* (2013.01); *G06K 19/06037* (2013.01)

(58) Field of Classification Search
CPC . H04L 63/0853; G06F 21/35; G06K 7/10712; G06K 7/1095; G06K 19/06037
See application file for complete search history.

(56) References Cited

U.S. PATENT DOCUMENTS

| | | | |
|---|---|---|---|
| 2002/0060246 A1 | 5/2002 | Gobburu et al. | |
| 2011/0231268 A1 | 9/2011 | Ungos | |
| 2013/0313314 A1 | 11/2013 | Jeng et al. | |
| 2014/0351589 A1 | 11/2014 | Chenna | |
| 2015/0288670 A1 | 10/2015 | Bhooshan | |
| 2016/0019536 A1 | 1/2016 | Ortiz et al. | |
| 2016/0314462 A1* | 10/2016 | Hong | G06Q 20/3274 |
| 2018/0302221 A1* | 10/2018 | Lu | H04L 9/3271 |

FOREIGN PATENT DOCUMENTS

| | | |
|---|---|---|
| CN | 102726028 A | 10/2012 |
| CN | 103957105 A | 7/2014 |
| CN | 105635036 A | 6/2016 |

(Continued)

OTHER PUBLICATIONS

Search Report appended to an Office Action issued to Taiwanese counterpart application No. 106110440 by the TIPO dated Sep. 19, 2017.

(Continued)

*Primary Examiner* — Laura A Gudorf
(74) *Attorney, Agent, or Firm* — MLO, a professional corp.

(57) ABSTRACT

In a method for identity authentication, a portable electronic device displays a barcode encoding verification information for verifying authorization of access to the portable electronic device, and identification information for authenticating an identity of a user of the portable electronic device. An identification device scans the barcode and generates an authentication command. An authentication server extracts the verification information and identification information from the authentication command. When determined that the verification information is authentic, the authentication server authenticates the identification information and transmits a result to the identification device.

10 Claims, 7 Drawing Sheets

(56) References Cited

FOREIGN PATENT DOCUMENTS

| | | | |
|---|---|---|---|
| CN | 106453341 | A | 2/2017 |
| JP | 2006195912 | A | 7/2006 |
| JP | 2007206762 | A | 8/2007 |
| JP | 2017017378 | A | 1/2017 |
| JP | 2017503253 | A | 1/2017 |
| JP | 2017041090 | A | 2/2017 |
| TW | M410932 | U1 | 9/2011 |
| TW | 201643791 | A | 12/2016 |

OTHER PUBLICATIONS

David Kuo, Daniel Wong, Jerry Gao, and Lee Chang, "A 2D Barcode Validation System for Mobile Commerce" Advances in Grid and Pervasive Computing, Springer Berlin Heidelberg, Berlin, Heidelberg, vol. 6104, pp. 150-161, May 10, 2010.
The Search Report issued to European counterpart application No. 18164434.5 by the EPO dated Jul. 24, 2018.
Office Action issued to Japanese counterpart application No. 2018-063023 by the JPO dated May 7, 2019.
Search Report appended to an Office Action, which was issued to Chinese counterpart application No. 201710409691.4 by the CNIPA dated Dec. 15, 2020, with an English translation thereof.

* cited by examiner

FIG.5

IDENTITY AUTHENTICATION USING A BARCODE

CROSS-REFERENCE TO RELATED APPLICATION

This application claims priority of Taiwanese Patent Application No. 106110440, filed on Mar. 29, 2017.

FIELD

The disclosure relates to a method for identity authentication, and more particularly to a method for identity authentication using a barcode.

BACKGROUND

In daily lives, various identity documents are required on different occasions. For example, a cash withdrawal in a bank may require an identity card, boarding a flight requires a passport, an appointment with a doctor may require a National Health Insurance IC card, and a driver's license is required for a roadside vehicle check. Each of the above exemplary identity documents is an individual document, and as a result, a person may be required to carry around multiple identity documents.

It may be desirable to digitize the multiple identity documents into digital files, and to store the digital files in a portable electronic device (e.g., a cell phone). In this way, the risk of missing one or more of the identity documents may be reduced, and the inconvenience caused by the combined size of the multiple cards may be eliminated.

It is noted that however, in the case of using a digitized identity document, there may be an issue of making sure that the digitized identity document really belongs to the person who holds the digitized identity document, since the digitized identity document may be altered, and the portable electronic device itself may be stolen.

SUMMARY

One object of the disclosure is to provide a method for identity authentication for authenticating both a digital identification and a holder holding the digital identification.

According to one embodiment of the disclosure, the method is implemented by a portable electronic device, an identification device, and an authentication server communicating with the portable electronic device and the identification device. The method includes:

in response to detection of a user operation for requesting to display a barcode, displaying, by the portable electronic device, a barcode on a display thereof, the barcode encoding verification information and identification information that is associated with an identity of a user of the portable electronic device, wherein, barcode data to be encoded in the barcode is separated into at least a first part and a second part, and before displaying the barcode, the portable electronic device combines the first part and the second part to obtain the barcode;

scanning, by the identification device, the barcode displayed on the display of the portable electronic device;

generating, by the identification device, an authentication command based on the barcode;

transmitting, by the identification device, the authentication command to the authentication server;

extracting, by the authentication server, the verification information and identification information from the authentication command;

determining, by the authentication server, whether the verification information is authentic;

when it is determined that the verification information is authentic, authenticating, by the authentication server, the identification information; and transmitting, by the authentication server to the identification device, an authentication result of the step of authenticating the identification information.

Specifically, the barcode is provided by the authentication server, and the first part of the barcode data is stored in a hardware security module installed on and accessible by the portable electronic device, and the second part of the barcode data is stored in one of the authentication server and a cloud server, the step of displaying a barcode includes:

accessing the hardware security module to obtain the first part of barcode data;

communicating with the one of the authentication server and a cloud server to obtain the second part of barcode data;

combining the first data and the second part of data to obtain the barcode data; and generating and displaying the barcode based on the barcode data.

According to another embodiment of the disclosure, the method is implemented by a portable electronic device, an identification device, and an authentication server communicating with the portable electronic device and the identification device. The method includes steps of:

displaying, by the portable electronic device, a barcode on a display thereof, the barcode encoding verification information and identification information that is associated with an identity of a user of the portable electronic device, wherein the identification information is provided to the portable electronic device by the authentication server and has a plurality of identity data sets that are associated with a plurality of identity documents, respectively, and the step of the displaying includes in response to detection of a user selection of a selected one of the identity documents, obtaining a corresponding one of the identity data sets that is associated with the selected one of the identity documents;

displaying, by the portable electronic device, an instruction to require the user to input a password, transmitting, by the portable electronic device, a request for an authorization parameter to the authentication server when the password is verified to be correct, in response to receipt of the authorization. parameter from the authentication server, creating, using a preset hey, a message authentication code (MAC) for the authorization parameter that serves as the verification information, generating barcode data for displaying the barcode based on the verification information, the identification information and the authorization parameter;

scanning, by the identification device, the barcode displayed on the display of the portable electronic device;

generating, by the identification device, an authentication command based on the barcode, the authentication command including the authorization parameter;

transmitting, by the identification device, the authentication command to the authentication server;

extracting, by the authentication server, the verification information and identification information from the authentication command;

determining, by the authentication server, whether the verification information is authentic, including comparing, the authorization parameter included in the authentication command with the authorization parameter stored in the authentication server, in response to the determination that the authorization parameter included in the authentication command and the authorization parameter stored in the authentication server are identical, using the preset key stored in the authentication server to create a MAC for the authorization parameter stored in the authentication server, and comparing the MAC thus generated with the MAC that serves as the verification information, and determining that the verification information is authentic when the MAC thus generated and the MAC that serves as the verification information are identical;

when it is determined that the verification information is authentic, authenticating, by the authentication server, the identification information; and transmitting, by the authentication server to the identification device, an authentication result of the step of authenticating the identification information.

According to another embodiment of the disclosure, the method is implemented by a portable electronic device, an identification device, and an authentication server communicating with the portable electronic device and the identification device. The authentication server includes a commercial platform and an authority party server. The portable electronic device is associated with a plurality of digital identifications that correspond with a plurality of identity documents, respectively. The method includes steps of:

dynamically generating, by the commercial platform, a barcode encoding verification information and identification information that is associated with an identity of a user of the portable electronic device, the identification information being pre-stored in the authority party server, wherein the commercial platform extracts at least a part of data of the selected one of the digital identifications to serve as the identification information based on a user selection of a selected one of the digital identifications, and generates the barcode data based on the identification information and the verification information stored in the authority party server;

scanning, by the identification device, the barcode displayed on the display of the portable electronic device;

generating, by the identification device, an authentication command based on the barcode;

transmitting, by the identification device, the authentication command to the commercial platform;

extracting, by the commercial platform, the verification information and identification information from the authentication command;

determining, by the commercial platform, whether the verification information is authentic;

when it is determined that the verification information is authentic, authenticating, by the authority party server, the identification information; and transmitting, by the authentication server to the identification device, an authentication result of the step of authenticating the identification information.

According to another embodiment of the disclosure, the method is implemented by a portable electronic device, an identification device, and an authentication server communicating with the portable electronic device and the identification device. The authentication server includes a commercial platform and an authority party server. The portable electronic device is associated with a plurality of digital identifications that correspond with a plurality of identity documents, respectively. The method includes steps of:

dynamically generating, by the authority party server, a barcode encoding verification information and identification information that is associated with an identity of a user of the portable electronic device, the identification information being pre-stored in the authority party server, wherein the authority party server extracts at least a part of data of the selected one of the digital identifications to serve as the identification information based on a user selection of a selected one of the digital identifications, and generates the barcode data based on the identification information and the verification information stored therein;

scanning, by the identification device, the barcode displayed on the display of the portable electronic device;

generating, by the identification device, an authentication command based on the barcode;

transmitting, by the identification device, the authentication command to the commercial platform;

extracting, by the commercial platform, the verification information and identification information from the authentication command;

determining, by the authority party server, whether the verification information is authentic;

when it is determined that the verification information is authentic, authenticating, by the authority party server, the identification information; and transmitting, by the authentication server to the identification device, an authentication result of the step of authenticating the identification information.

According to another embodiment of the disclosure, the method is implemented by a portable electronic device and an identification device 0. The method includes:

separating, by the portable electronic device, data to be encoded in a barcode into at least two data files, and storing the at least two data files in the portable electronic device, the barcode encoding verification information and identification information that is associated with an identity of the user;

in response to detection of a user operation for requesting to display the barcode, combining, by the portable electronic device, the at least two data files to obtain the barcode and displaying, by the portable electronic device, the barcode on a display thereof;

scanning, by the identification device, the barcode displayed on the portable electronic device, and decoding the barcode;

extracting, by the identification device, the verification information and identification information from the barcode, and determining whether the verification information is authentic;

when it is determined that the verification information is authentic, authenticating, by the identification device, the identification information; and generating, the identification device, an authentication result of the step of authenticating the identification information.

Another object of the disclosure is to provide a portable electronic device that is able to perform the above-mentioned method with other parties.

According to one embodiment of the disclosure, the portable electronic device includes:

a display for displaying a barcode;

an input interface allowing a user to input a password;

a data storage storing data to be encoded is the barcode, wherein the data is separated into at least two data files;

a processor electrically connected to the display, and programmed to, before displaying the barcode, combine the at least two data files to obtain the barcode and control the display to display the barcode for scanning by an identification device, so as to enable the identification device to generate an authentication command based on the barcode and to transmit the authentication command to an authentication server, the authentication server extracting the verification information and the identification information from the authentication command, determining whether the verification information is authentic, authenticating the identification information when it is determined that the verification information is authentic, and transmitting an authentication result of the authenticating of the identification information to the identification device.

Another object of the disclosure is to provide a server device that is able to perform the above-mentioned method with other parties.

According to one embodiment of the disclosure, the server device includes:

a commercial platform for communicating with a portable electronic device and as identification device; and an authority party server communicating with the commercial platform;

wherein the commercial platform is programmed to dynamically generate a barcode, the barcode encoding verification information and identification information that is associated with as identity of a user of the portable electronic device, wherein the identification information is stored in the authority party server, and is associated with a user selection of a selected one of a plurality of identity documents of a user, transmit the barcode to the portable electronic device so as to enable the portable electronic device to display the barcode, receive, from the identification device, an authentication command, the identification device scanning the barcode displayed by the portable electronic device and generating the authentication command based on the barcode, extract the verification information and identification information from the authentication command, determine whether the verification information is authentic, and transmit the identification information to the authority party server when it is determined that the verification information is authentic, wherein, the authority party server is programmed to, upon receipt of the identification information, authenticate the identification information, and transmit an authentication result of authenticating the identification information to the identification device.

According to another embodiment of the disclosure, the server device includes:

a commercial platform for communicating with a portable electronic device and an identification device; and an authority party server communicating with the commercial platform;

wherein the authority party server is programmed to dynamically generate a barcode, the barcode encoding verification information and identification information that is associated with an identity of a user of the portable electronic device, wherein the identification information is stored in the authority party server, and is associated with a user selection of a selected one of a plurality of identity documents of a user, transmit the barcode to the portable electronic device so as to enable the portable electronic device to display the barcode, receive, from the commercial platform, an authentication command, the identification device scanning the barcode displayed by the portable electronic device, generating the authentication command based on the barcode and transmitting the authentication command to the commercial platform, extract the verification information and identification information from the authentication command, determine whether the verification information is authentic, and when it is determined that the verification information is authentic, authenticate the identification information, and transmit an authentication result of authenticating the identification information to the identification device via the commercial platform.

BRIEF DESCRIPTION OF THE DRAWINGS

Other features and advantages of the disclosure will become apparent in the following detailed description of the embodiments with reference to the accompanying drawings, of which:

FIGS. 5 and 6 illustrate two forms of identification information associated with an identity document.

DETAILED DESCRIPTION

Figure 1:
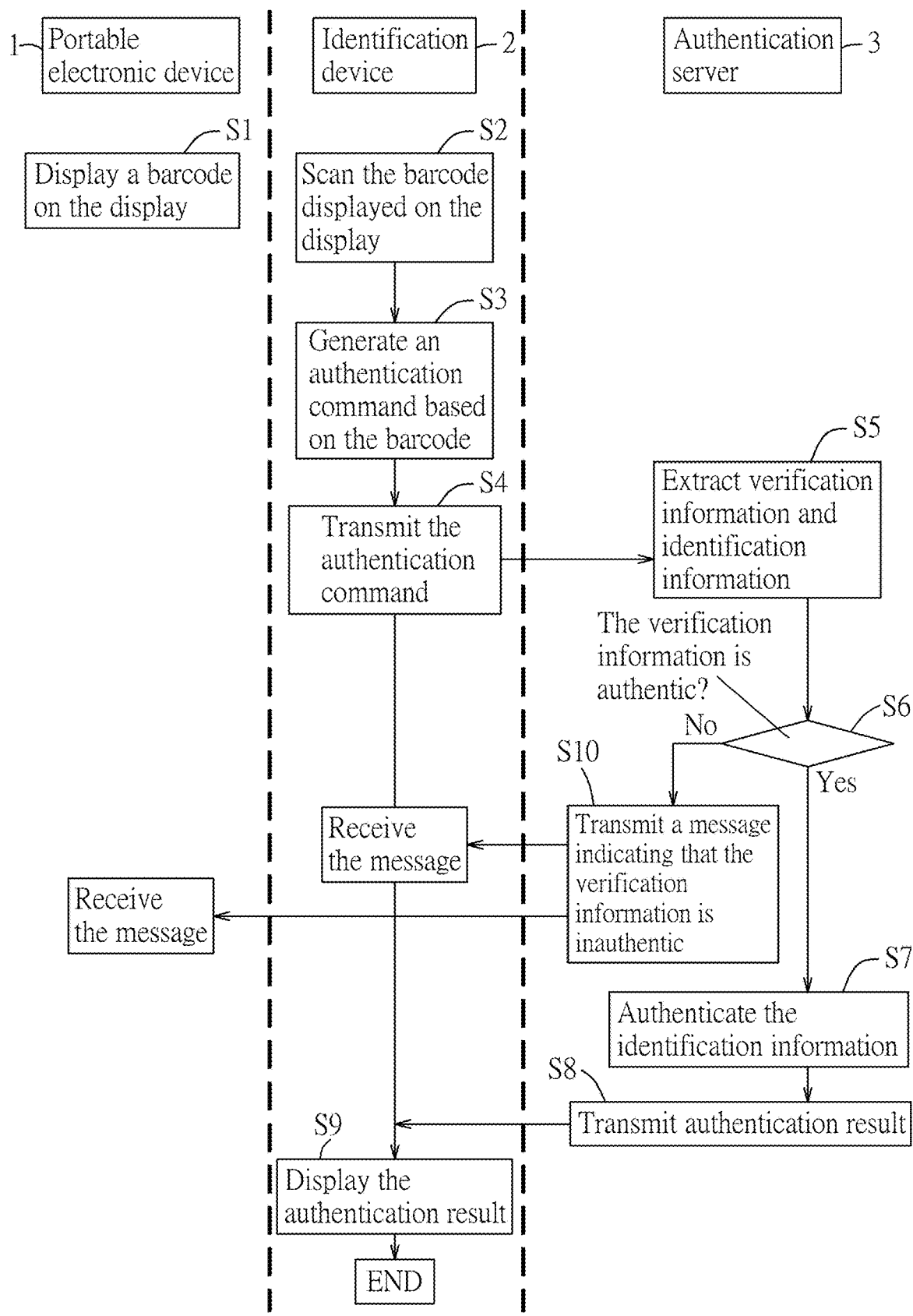
FIG. 1 is a flow chart illustrating steps of a method for identity authentication according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
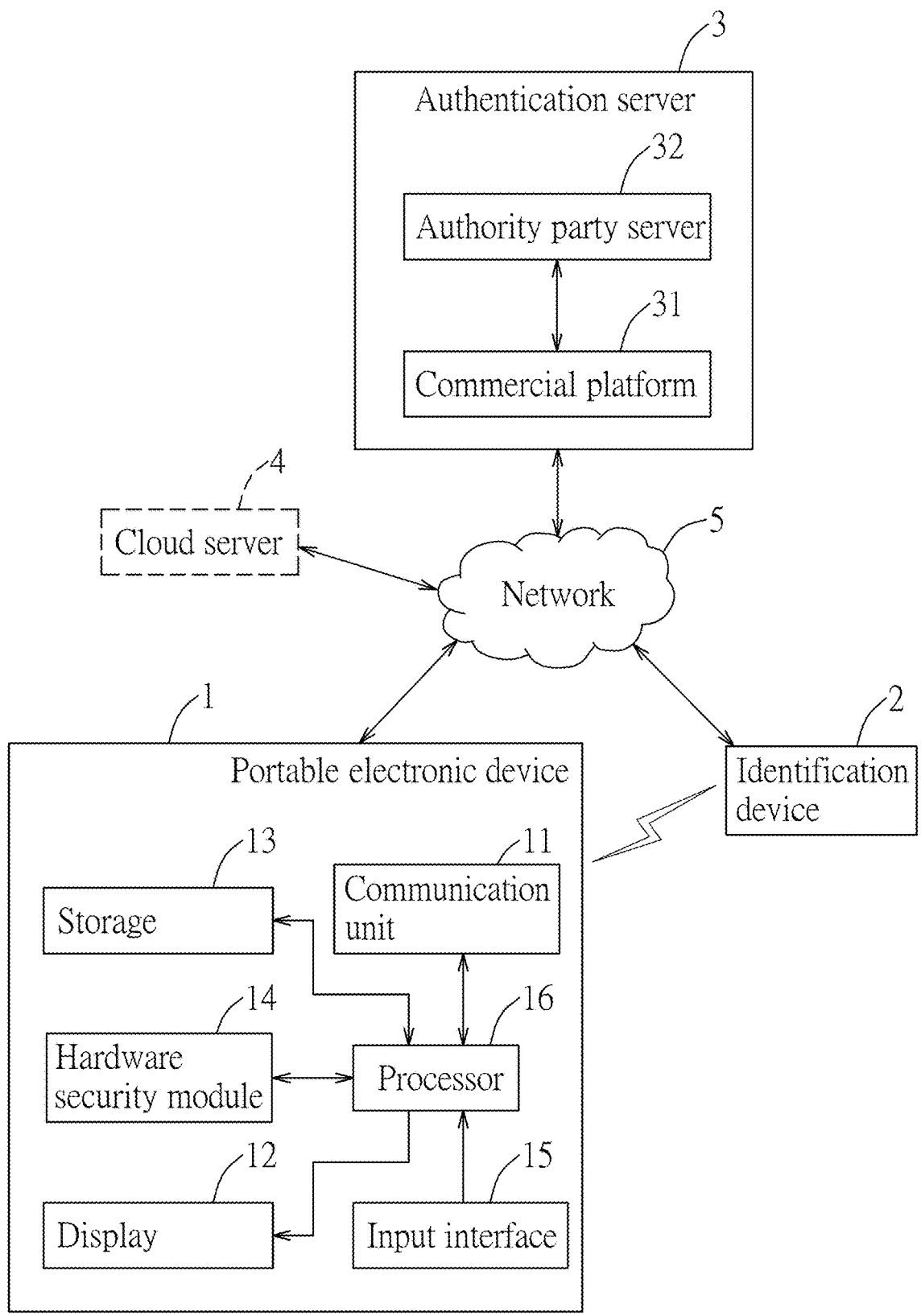
FIG. 2 is a block diagram illustrating a portable electronic device, an identification device, and an authentication server according to one embodiment of the disclosure.

FIG. 1 is a flow chart illustrating steps of a method for identity authentication according to one embodiment of the disclosure. FIG. 2 is a block diagram illustrating a portable electronic device 1, an identification device 2 and an authentication server 3 cooperating to implement the method for identity authentication as illustrated in FIG. 1.

In this embodiment, the portable electronic device 1 is held by a holder, and may be embodied by a mobile phone, a tablet computer, or other portable electronic devices with wireless connectivity.

As shown in FIG. 2, the portable electronic device 1 includes a processor 16, a communication unit 11, a display 12, a storage 13, and an input interface 15. In this embodiment, a hardware security module 14 is installed on and accessible by the portable electronic device 1. The hardware security module 14 is implemented by hardware, and may be embodied using one of a stand-alone, external portable device (e.g., a smart card) removably connected to the portable electronic device 1 and a physical built-in module (e.g., a chip) embedded in the portable electronic device 1. In general, the hardware security module 14 includes a processing component for performing computations, and a physical storage for storing data therein. An exemplary smart card may be embodied using one as disclosed in European Patent No. EP2521081.

Figure 3:
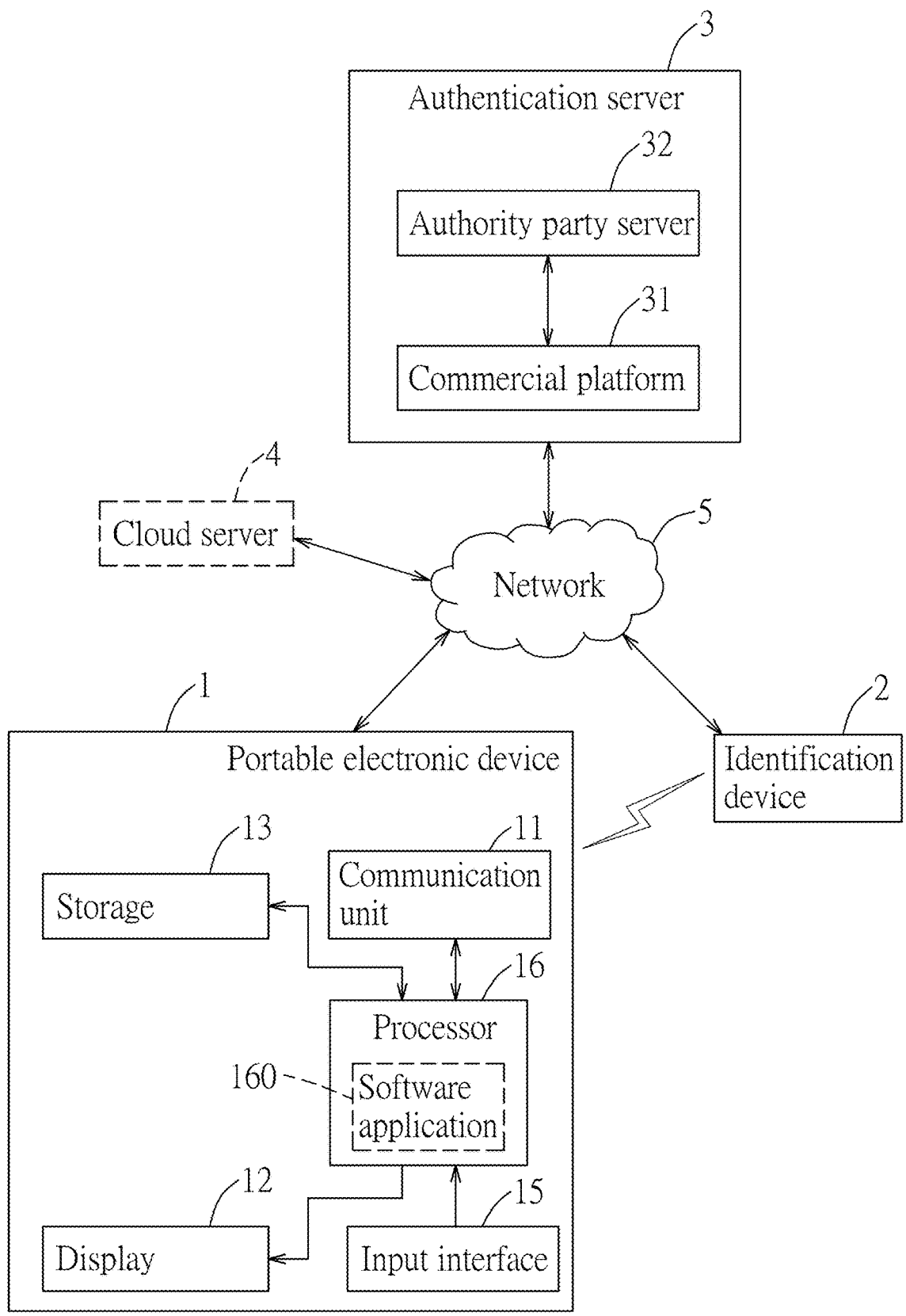
FIG. 3 is a block diagram illustrating a portable electronic device, an identification device, and an authentication server according to one embodiment of the disclosure.

It is noted that in embodiments where the hardware security module 14 is omitted or when the hardware security module 14 is not available for connection with the portable electronic device 1, and the functionalities of the hardware security module 14 may be performed by the portable electronic device 1 executing a software application 160, as seen in FIG. 3. Alternatively, the hardware security module 14 and the software application 160 may both be included in the portable electronic device 1.

The communication unit 11 may be a component that supports wireless communication such as cellular connection, Wi-Fi, Bluetooth®, etc. The display 12 may be embodied using a display screen (e.g., an LCD screen). The storage 13 may be embodied using a physical memory device such as a non-volatile random access memory (NVRAM), e.g., a flash memory. The input interface 15 may be incorporated with the display screen to together form a touch screen.

Figure 5:
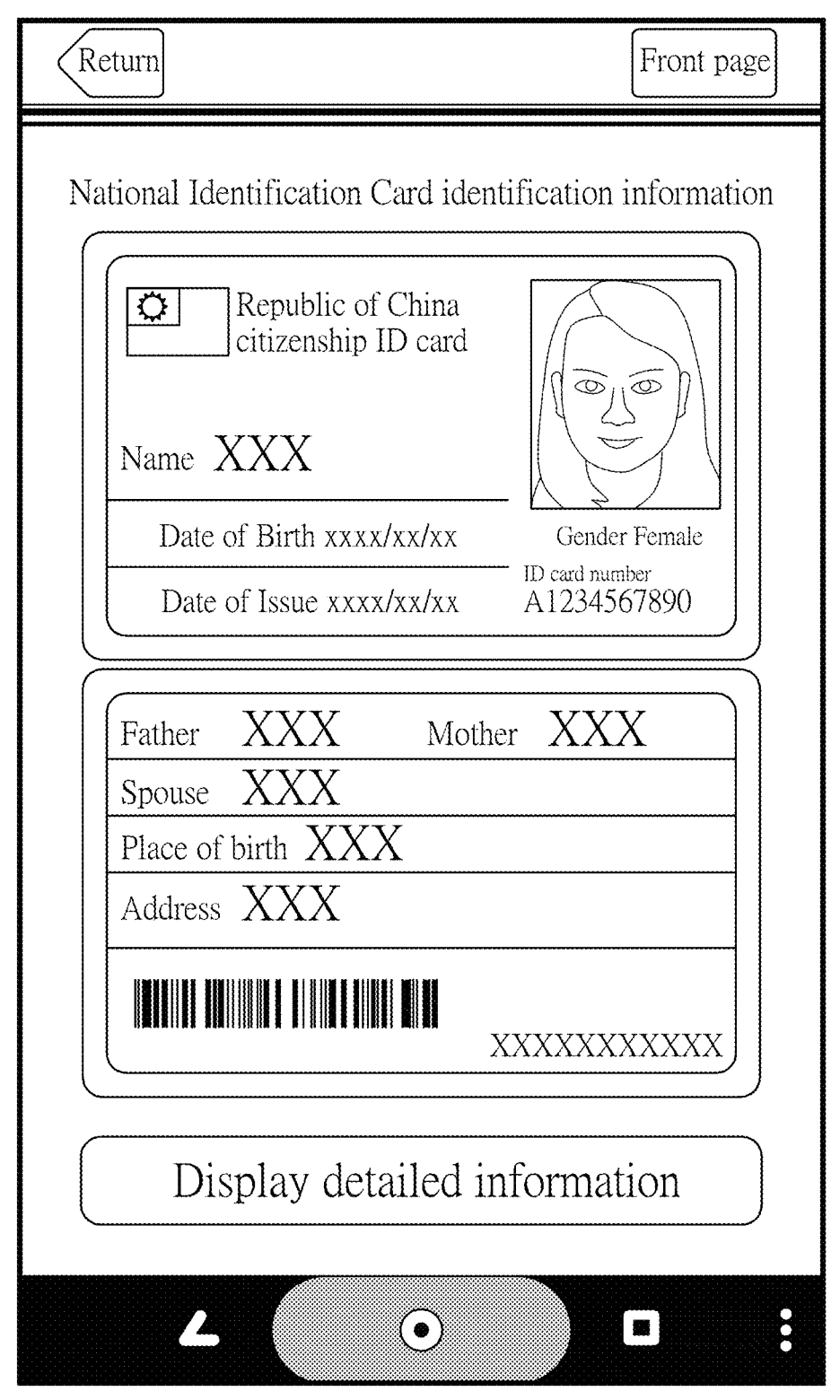

The portable electronic device 1 may be associated with one or more digital identifications corresponding to one or more identity documents, and may store identification information that is associated with an identity of the holder of the portable electronic device 1. Throughout the disclosure, the term "identity document" may be a physical card or paper issued by an authority party, such as a government agency, for providing certification for identity of a person. The term "digital identification" may be a digital data file that is stored in the storage 13 and that includes at least one image of a corresponding identity document (e.g., two images of opposite sides of a National Identification Card issued in Taiwan as shown in FIG. 5), text data regarding information listed on the identity document (e.g., a name, an identification card number, date of birth, gender, a registered address of the holder, as shown in FIG. 5), or other information relevant to the holder. Other examples of the identity document may include a passport, a National Health Insurance IC card, a driver's license, etc. In some cases, a plurality of digital identifications, each corresponding with an identity document (e.g., an identification card, a passport or a driver's license, etc.), may be stored in the portable electronic device 1.

The term "identification information" may refer to a data set, for example in the form of a string of numbers and/or alphabets, that is associated exclusively with the user of the portable electronic device 1. For example, an identification card number or a virtual account number may serve as the identification information. It is noted that, each of the digital identifications may contain specific data (e.g., a serial number assigned by the authority party) that is unique, and that may be employed to serve as the identification information in some embodiments. Alternatively, in some implementations, the identification information may be in the form of other data uniquely associated with the identity of the holder, such as a virtual account number.

The identification device 2 may be held by a party who intends to view the identity document of the holder, and may be embodied using a personal computer, a notebook computer, a tablet computer, a mobile communication device or other electronic devices with network communication capabilities, and includes an image capturing component (not shown) (such as a camera, a barcode reader, etc.).

The authentication server 3 is capable of communicating with the portable electronic device 1 and the identification device 2 via a network 5 (e.g., the Internet), and includes a commercial platform 31 with network connectivity, and an authority party server 32 communicating with the commercial platform 31. The authority party server 32 may be owned by, operated by, or under the control of the authority party that issues one of the identity documents. For example, in cases that the identification information includes a data set that corresponds to the National Identification Card and that includes information regarding the National Identification Card, the authority party server 32 may be owned by or under the control of the Ministry of the Interior of Taiwan. It is noted that a plurality of parties that issue various identity documents may serve as the authority party that is responsible for the authority party server 32 in different embodiments.

In use, when a requesting party requires the holder of the portable electronic device 1 to present an identity document and the holder decides to present a digital identification, the holder may first initiate the method for identity authentication, so as to provide proof that the digital identification is actually associated with him/her.

To initiate the method, the holder may operate the input interface 15 of the portable electronic device 1 to input a request for displaying a barcode on the display 12.

This may be done by the holder operating the input interface 15 to generate a command for causing the processor 16 to execute the software application 160. In response to the holder's operation, in step S1, the processor 16 executes the software application 160 so as to execute a process to display a barcode on the display 12.

Figure 4:
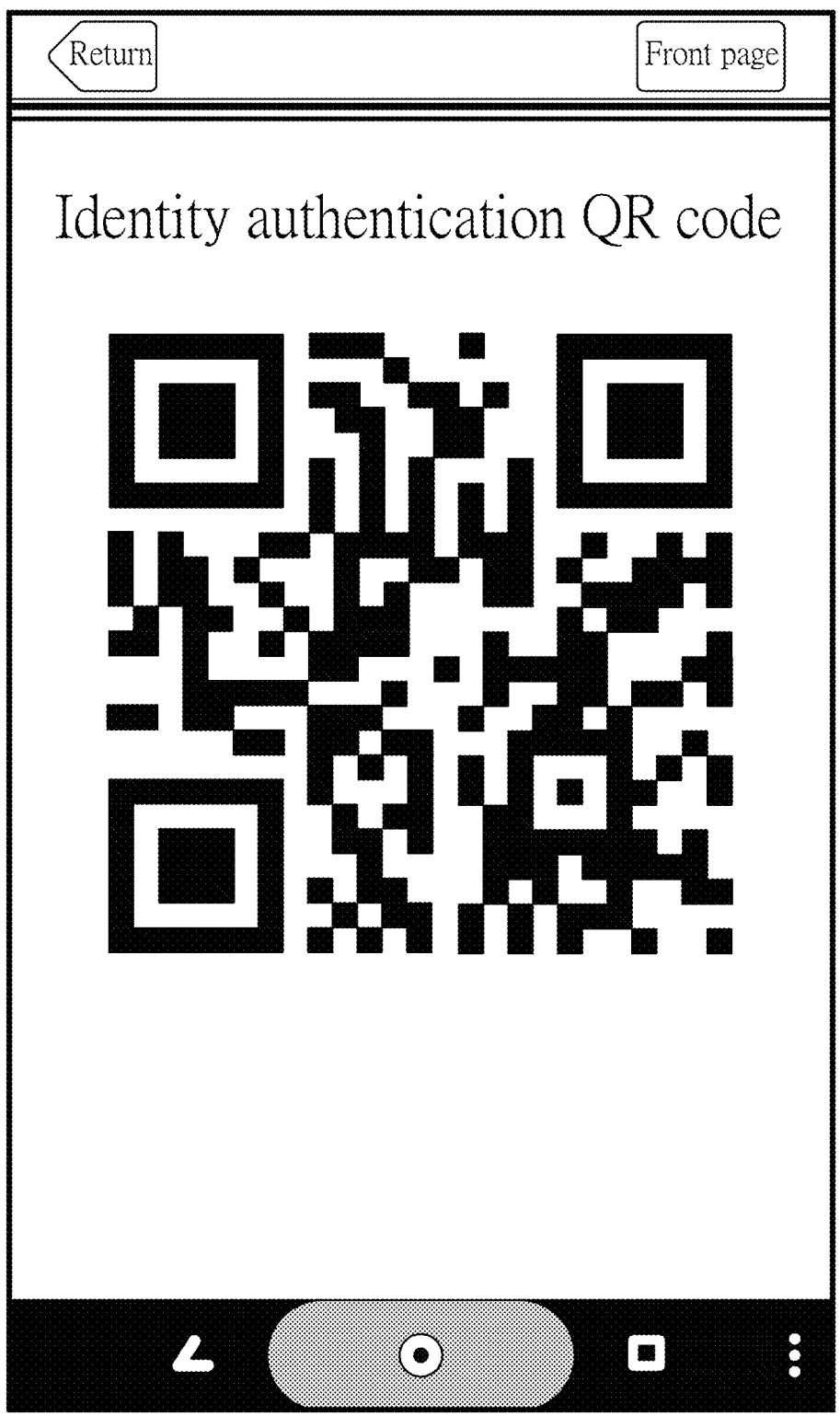
FIG. 4 illustrates a quick response code displayed by the portable electronic device.

In this embodiment, the barcode may be in a form of a one-dimensional barcode (linear barcode), a two-dimensional barcode such as a quick response (QR) code (an example of which is shown in FIG. 4), a three-dimensional barcode, etc., and encodes verification information for verifying an identity of the holder, and further encodes identification information corresponding to a digital identification associated with the holder.

In some embodiments, the processor 16 may require the holder to input a password using the input interface 15, and execute the process only when determining that the password inputted by the holder is correct.

In some embodiments, the barcode may be a static barcode that encodes data provided by the commercial platform 31 of the authentication server 3. For example, the data to be encoded in the static barcode may be stored in advance in the hardware security module 14 which is installed on and accessible by the portable electronic device 1. As such, the processor 16 may require the holder to input a password using the input interface 15, and transmit the password to the hardware security module 14, which verifies the password and allows the processor 16 to obtain the data stored therein for subsequent display only when the password is successfully verified (i.e., the password is verified or deemed to be correct).

Afterward, in step S2, the requesting party may operate the image capturing component of the identification device 2 to scan the barcode displayed on the display 12.

In step S3, the identification device 2 generates an authentication command based on the barcode (which is encoded with the verification information and the identification information), so that the authentication command includes the verification information and the identification information, either in encoded form or non-encoded form. Then, in step S4, the identification device 2 transmits the authentication command to the authentication server 3.

In response to receipt of the authentication command, the authentication server 3 extracts the verification information and the identification information from the authentication command in step S5. Then, in step S6, the authentication server 3 determines whether the verification information is authentic.

When it is determined that the verification information is authentic, the flow proceeds to step S7, in which the authentication server 3 executes an authentication procedure to authenticate the identification information included in the authentication command. This may be done by the authentication server 3 comparing parts or the entirety of the identification information to related information that is pre-stored in a storage of the authentication server 3.

Otherwise, the flow proceeds to step S10, in which the authentication server 3 transmits to the portable electronic device 1 and the identification device 2 a message indicating that the verification information is inauthentic, and the method is therefore terminated.

Following step S7, i.e., when the authenticating procedure ends, the flow proceeds to step S8, where the authentication server 3 transmits an authentication result to the identification device 2. In response to receipt the authentication result, the identification device 2 may display the authentication result thereon in step S9 to inform the requesting party who holds the identification device 2 whether the digital identification is actually associated with the holder.

Figure 6:
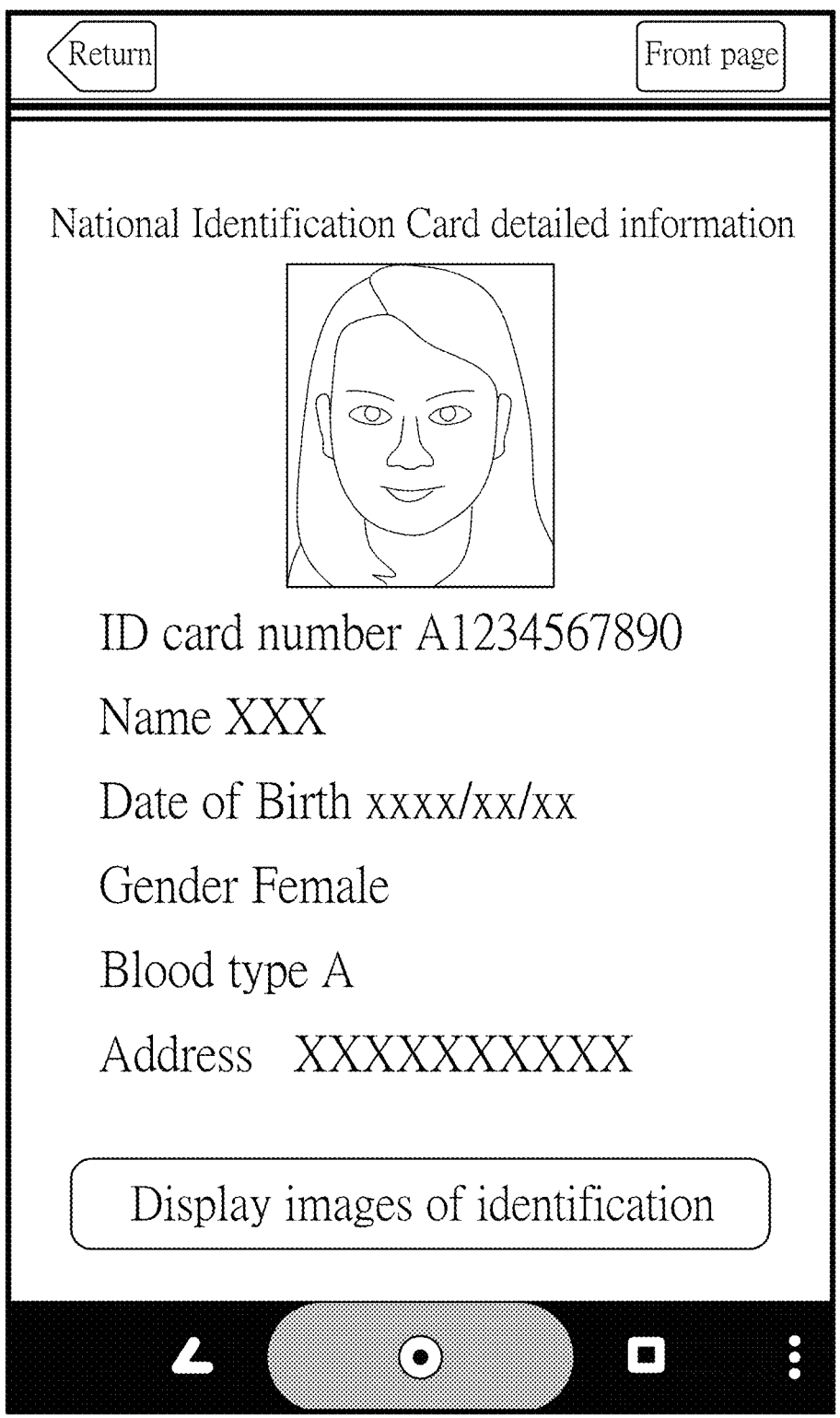

Then, the requesting party may request the holder to present the digital identification using the portable electronic device 1. The holder may input another command to invoke the digital identification to be displayed on the display 12. In one example shown in FIG. 5, the digital identification displayed is an image of two sides of the National Identification Card of Taiwan. In one example shown in FIG. 6, the digital identification displayed includes detailed information contained in the National Identification Card of Taiwan. In this embodiment, the portable electronic device 1 is capable of displaying the digital identification in both the forms illustrated in FIGS. 5 and 6.

In one embodiment, the authentication server 3 pre-stores the digital identification of the holder. Accordingly, in step S8, the authentication server 3 may further transmit the digital identification to the identification device 2, such that the identification device 2 may further display the digital identification in step S9.

In one embodiment, in step S8, the authentication server 3 further transmits the authentication result to the portable electronic device 1. In response to receipt of the authentication result, the portable electronic device 1 executing the application 160 may automatically display the digital identification.

It is noted that in various embodiments, the barcode may be generated in various ways before being displayed, and may include various information based on different conditions. As a result, before step S1 performed, some operations may be carried out in different manners, and additional operations may be incorporated prior to or after step S1, as described in the following paragraphs.

According to one exemplary embodiment, the barcode is a static barcode encoding data provided by the authentication server 3. Before implementing step S1, the data to be encoded in the barcode and provided by the authentication server 3 is divided into a first part that is stored in the commercial platform 31 or a cloud server 4, and a second part that is stored in the hardware security module 14. As such, in step S1, the portable electronic device 1, by the communication unit 11 communicating with the commercial platform 31 or the cloud server 4, obtains the first part of the data, accesses the hardware security module 14 to obtain the second part of the data, combines the first part and the second part to obtain the data to be encoded in the barcode, and generates and displays the barcode based on the data.

According to one exemplary embodiment, the barcode is a static barcode encoding the data provided by the authentication server 3. Before implementing step S1, the portable electronic device 1 may communicate with the commercial platform 31 to obtain the data to be encoded in the barcode, divide the data obtained from the commercial platform 31 into a plurality of divided files, and store the divided files in the hardware security module 14. As such, in step S1, the portable electronic device 1 may access the hardware security module 14 to obtain the divided files, combine the divided files to obtain the data, and generate and display the barcode based on the data.

According to one exemplary embodiment, the barcode is a static barcode encoding the data provided by the authentication server 3. Before implementing step S1, the portable electronic device 1 may communicate with the commercial platform 31 to obtain the data to be encoded in the barcode, divide the data obtained from the commercial platform 31 into at least a first divided file and a second divided file, encrypt at least the first divided file into an encrypted file, and store the encrypted file and the second divided file in the storage 13.

As such, step S1 may include the sub-steps of the portable electronic device 1 accessing the storage 13 to obtain the encrypted file and the second divided file, displaying an instruction to require the holder to input a password, and determining whether a password inputted by the is correct. Further, in step S1, when it is determined that the password inputted by the holder is correct, the portable electronic device 1 decrypts the encrypted file to obtain the first divided file, combines the first and second divided files to obtain the data, and generates and displays the barcode based on the data. In some implementations, both the first divided file and the second divided file may be encrypted prior to step S1, and in step S1 both of the divided files are decrypted.

It is noted that this embodiment may be employed when the hardware security module 14 is not available, and the functionalities of the hardware security module 14 may be performed by the portable electronic device 1 executing the software application 160.

According to one exemplary embodiment, one or more digital identifications corresponding to one or more identity documents may be stored in the portable electronic device 1 and accessible by the software application 160, and then made available to the holder. In the case that the software application 160 is only associated with one digital identification (e.g., only one digital identification is stored in the portable electronic device 1), the identification information (e.g., a unique identification code, a virtual account number, or an identification card number, etc.) may be pre-stored in the hardware security module 14. In the case that the software application 160 is associated with a plurality of different digital identifications corresponding respectively to different identity documents (e.g., an identification card, a passport issued by the Ministry of Foreign Affairs, a National Health Insurance (NHI) IC card issued by the NHI Administration, and a driver's license issued by the Ministry of Transportation and Communications, etc.), the identification information may be generated by the portable electronic device 1 based on a selected one of the identity documents selected by the holder and stored in the hardware security module 14 prior to displaying the barcode.

According to one exemplary embodiment, prior to step S1, the portable electronic device 1 executing the software application 160 may transmit, via the network 5, a request for barcode data for displaying the barcode to the authentication server 3, and the barcode is a fixed barcode.

Upon receipt of the barcode data from the authentication server 3, the portable electronic device 1 divides the barcode data into a first part and a second part, stores the first part of the barcode data in the storage 13, and stores the second part of the barcode data in one of the authentication server 3 and the cloud server 4. It is noted that in this embodiment, the first part of the barcode data is stored in the storage 13 at an arbitrary address of the storage 13, while in other implementations, the first part of the barcode data may be stored in a specified file directory of the storage 13 that is accessible by the software application 160, and the portable electronic device 1 executing the software application 160 is able to obtain the first part of the barcode data by accessing the file directory.

In step S1, the portable electronic device 1 accesses the one of the authentication server 3 and the cloud server 4 to obtain the second part of the barcode data, combines the first and second parts to obtain the barcode data, and generates and displays the barcode based on the barcode data.

In an alternative implementation, upon receipt of the barcode data from the authentication server 3, the portable electronic device 1 divides the barcode data into a plurality of divided files, and stores the plurality of divided files into the storage 13 of the portable electronic device 1.

In step S1, the portable electronic device 1 accesses the storage 13 to obtain the divided files, combines the divided files to obtain the barcode data, and generates and displays the barcode based on the barcode data.

In an alternative implementation, upon receipt of the barcode data from the authentication server 3, the portable electronic device 1 divides the barcode data into at least a first divided file and a second divided file. Afterward, the portable electronic device 1 encrypts at least the first divided file into an encrypted file, and stores the encrypted file and the second divided files into the storage 13.

In step S1, the portable electronic device 1 accesses the storage 13 to obtain the encrypted file and the second divided file, and displays an instruction to require the user to input a password. When a password inputted by the user is correct, the portable electronic device 1 decrypts the encrypted file to obtain the first divided file, combines the first and second divided files to obtain the barcode data, and generates and displays the barcode based on the barcode data.

According to one exemplary embodiment, in step S3, the identification device 2 is programmed to incorporate the barcode into the authentication command without decoding the barcode.

In step S5, the authentication server 3 is programmed to decode the barcode included in the authentication command to obtain the verification information and identification information therefrom.

In an alternative implementation, in step S3, the identification device 2 is programmed to decode the barcode to obtain the verification information and identification information therefrom, and to incorporate the verification information and identification information into the authentication command. As such, in step S5, the authentication server 3 is able to obtain the verification information and identification information directly from the authentication command.

In some embodiments, the authentication server 3 may include a plurality of commercial platforms 31 and/or a plurality authority party servers 32, and implementation of various steps described above may be done by any one of the commercial platforms 31 and the authority party servers 32, or by both.

Figure 7:
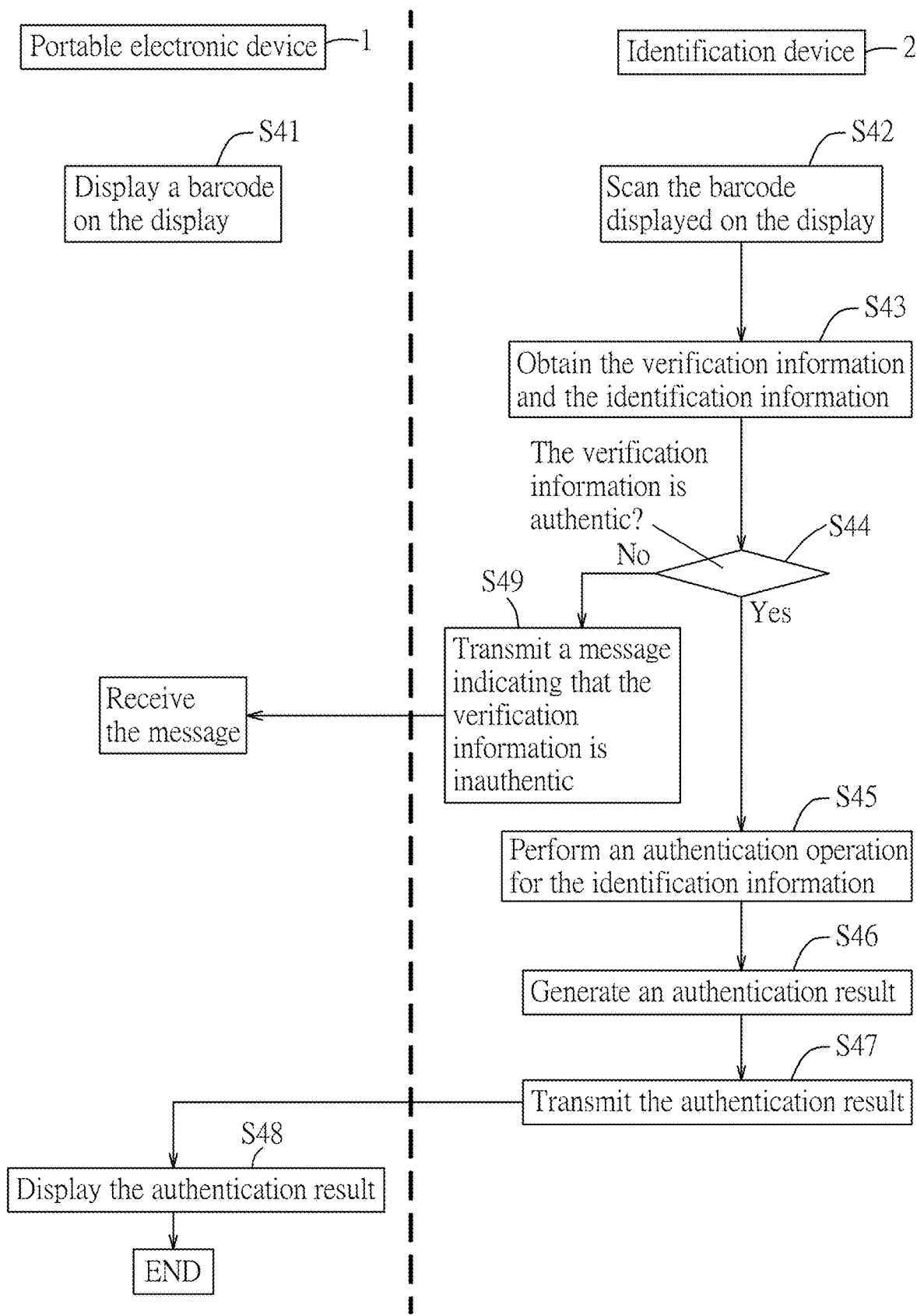
FIG. 7 is a flow chart illustrating steps of a method for identity authentication according to one embodiment of the disclosure.

FIG. 7 is a flow chart of a method for identity authentication to be implemented by the portable electronic device 1 and the identification device 2, according to one embodiment of the disclosure.

It is noted that the authentication server 3 is not required to participate in the method of this embodiment, and the portable electronic device 1 and/or the identification device 2 may be embodied using ones as depicted in the embodiments of FIGS. 2 and 3.

In response to operation by the holder, in step S41, the processor 16 executes the software application 160 so as to execute a process to display a barcode on the display 12.

In this embodiment, the barcode may be in the form of a one-dimensional barcode (linear barcode), a two-dimensional barcode such as a quick response (QR) code, or a three-dimensional barcode, etc., and encodes the verification information for verifying an identity of the holder, and the identification information corresponding to a digital identification associated with the holder.

Afterward, in step S42, the requesting party may operate the image capturing component of the identification device 2 to scan the barcode displayed on the display 12.

In step S43, the identification device 2 decodes the barcode to obtain the verification information and the identification information encoded in the barcode.

In step S44, the identification device 2 determines whether the verification information obtained in step S43 is authentic.

Specifically, the identification device 2 may have the verification information and the identification information pre-stored therein, and step S44 may be done by the identification device 2 comparing the verification information obtained in step S43 and the verification information stored therein.

When it is determined that the verification information obtained in step S43 is authentic, the flow proceeds to step S45, in which the identification device 2 performs an authentication operation for the identification information. Otherwise, the flow proceeds to step S49, in which the identification device 2 transmits a message to the portable electronic device 1 indicating that the verification information is inauthentic, and the method is therefore terminated.

The authentication operation may be done by the identification device 2 comparing the identification information obtained in step S43 and the identification information stored therein (step S45).

Afterward, in step S46, the identification device 2 generates an authentication result based on the execution of the authentication operation.

In step S47, the identification device 2 transmits the authentication result to the portable electronic device 1. It is noted that the identification device 2 may establish a wireless connection with the portable electronic device 1 using short distance wireless communication (e.g., near field communication (NFC), Bluetooth®, etc.) for data transmission.

In response, the portable electronic device 1 may display the authentication result on the display 12 in step S48.

In one alternative implementation, in step S46, the identification device 2 further records the authentication result.

In one alternative implementation, after step S46, the identification device 2 further displays the authentication result thereon. In one alternative implementation, the identification device 2 both records the authentication result in step S46, and displays the authentication result after step S46.

In various implementations, the barcode may be a static barcode encoding data that is provided by the commercial platform 31 prior to the method for identity authentication is executed, or may be generated by the hardware security module 14 or the portable electronic device 1 executing the software application 160. Details regarding the generation of the barcode are already described in the exemplary embodiments associated with the method illustrated in FIG. 1, and will not be repeated herein for the sake of brevity.

According to one embodiment of the disclosure, there is provided a portable electronic device. The portable electronic device includes a processor, a communication unit, a display, a data storage and an input interface.

The processor is programmed to, in response to detection of a user operation for requesting to display a barcode, control the display to display an instruction to require the user to input a password via the input interface, and to verify a password inputted by the user. When the password is successively verified, the processor generates a barcode that encodes verification information for verifying an identity of the user, and identification information for authenticating an identity of a user of the portable electronic device. Specifically, the data storage stores data to be encoded in the barcode, and the data is separated into at least two data files.

Afterward, the processor combines the at least two data files to obtain the barcode, and controls the display to display the barcode for scanning by an identification device, so as to enable the identification device to generate an authentication command based on the barcode, and to execute an authentication procedure with an authentication server.

In this embodiment, the hardware security module may be embodied using one of an external portable device removably connected to the portable electronic device, and a built-in module embedded in the portable electronic device.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for identity authentication to be implemented by a portable electronic device, an identification device, and an authentication server communicating with the portable electronic device and the identification device, the method comprising steps of:
   displaying, by the portable electronic device, a barcode on a display thereof, the barcode encoding verification information and identification information that is associated with an identity of a user of the portable electronic device, wherein the identification information is provided to the portable electronic device by the authentication server and has a plurality of identity data sets that are associated with a plurality of identity documents, respectively, and the step of the displaying includes
      in response to detection of a user selection of a selected one of the identity documents, obtaining a corresponding one of the identity data sets that is associated with the selected one of the identity documents;
   displaying, by the portable electronic device, an instruction to require the user to input a password,
   transmitting, by the portable electronic device, a request for an authorization parameter to the authentication server when the password is verified to be correct,
   in response to receipt of the authorization parameter from the authentication server, creating, using a preset key, a message authentication code (MAC) for the authorization parameter that serves as the verification information,
   generating barcode data for displaying the barcode based on the verification information, the identification information and the authorization parameter;
   scanning, by the identification device, the barcode displayed on the display of the portable electronic device;
   generating, by the identification device, an authentication command based on the barcode, the authentication command including the authorization parameter;
   transmitting, by the identification device, the authentication command to the authentication server;
   extracting, by the authentication server, the verification information and identification information from the authentication command;
   determining, by the authentication server, whether the verification information is authentic, including
      comparing, the authorization parameter included in the authentication command with the authorization parameter stored in the authentication server,
      in response to the determination that the authorization parameter included in the authentication command and the authorization parameter stored in the authentication server are identical, using the preset key stored in the authentication server to create a MAC for the authorization parameter stored in the authentication server, and comparing the created MAC with the MAC that serves as the verification information, and
      determining that the verification information is authentic when the created MAC and the MAC that serves as the verification information are identical;
   when the verification information is determined to be authentic, authenticating, by the authentication server, the identification information; and
   transmitting, by the authentication server to the identification device, an authentication result of the step of authenticating the identification information.

2. The method of claim 1, a hardware security module being installed on and accessible by the portable electronic device, the identification information being issued by the authentication server and being stored in the portable electronic device, wherein the step of displaying a barcode includes:

in response to detection of a user selection of a selected one of the identity documents, transmitting to the hardware security module a corresponding one of the identity data sets that is associated with the selected one of the identity documents;

displaying, by the portable electronic device, an instruction to require the user to input a password;

in response to receipt of a password inputted by the user, requiring, by the portable electronic device, the hardware security module to verify the password;

transmitting, by the portable electronic device, a request for an authorization parameter to the authentication server when the password is verified to be correct by the hardware security module;

in response to receipt of the authorization parameter from the authentication server, creating, by the hardware security module using a preset key, a message authentication code (MAC) for the authorization parameter to serve as the verification information;

generating, by the hardware security module, barcode data based on the verification information, the corresponding one of the identity data sets of the identification information, and the authorization parameter; and transmitting, by the hardware security module, the barcode data to the portable electronic device; and displaying, by the portable electronic device, the barcode based on the barcode data.

3. The method of claim 1, the portable electronic device being installed with a software application, the identification information being issued by the authentication server and being stored in the portable electronic device, wherein the step of displaying a barcode includes:

in response to detection of a user selection of a selected one of the identity documents, transmitting to the processor executing the software application a corresponding one of the identity data sets that is associated with the selected one of the identity documents;

displaying, by the portable electronic device, an instruction to require the user to input a password;

in response to receipt of a password inputted by the user, requiring, by the portable electronic device, the processor executing the software application to verify the password;

transmitting, by the portable electronic device, a request for an authorization parameter to the authentication server when the password is verified to be correct by the processor executing the software application;

in response to receipt of the authorization parameter from the authentication server, creating, by the processor executing the software application using a preset key, a message authentication code (MAC) for the authorization parameter to serve as the verification information;

generating, by the processor executing the software application, barcode data based on the verification information, the corresponding one of the identity data sets of the identification information, and the authorization parameter; and displaying, by the portable electronic device, the barcode based on the barcode data.

4. The method of claim 1, the authentication server including a commercial platform that stores the preset key and the authorization parameter, and an authority party server that issues the identification information, wherein:

the method further comprises, prior to the step of dynamically generating barcode data for displaying the barcode, a step of transmitting, by the portable electronic device to the commercial platform, a request for the authorization parameter;

the step of determining whether the verification information received from the identification device is authentic includes comparing, by the commercial platform, the authorization parameter included in the authentication command with the authorization parameter stored in the commercial platform, in response to the determination that the authorization parameter included in the authentication command and the authorization parameter stored in the commercial platform are identical, using the preset key stored in the commercial platform to create a MAC for the authorization parameter stored in the commercial platform, and comparing the created MAC with the MAC that serves as the verification information, and determining that the verification information is authentic when the created MAC and the MAC that serves as the verification information are identical.

5. The method of claim 1, the authentication server including a commercial platform and an authority party server that stores the verification information and the identification information therein, wherein the method further comprises, before the step of displaying a barcode, steps of:

wherein the method further comprises, prior to the step of dynamically generating barcode data for displaying the barcode, a step of transmitting, by the portable electronic device to the authority party server, a request for the authorization parameter;

wherein the step of determining whether the verification information received from the identification device is authentic includes comparing, by the authority party server, the authorization parameter included in the authentication command with the authorization parameter stored in the authority party server, in response to the determination that the authorization parameter included in the authentication command and the authorization parameter stored in the authority party server are identical, using the preset key stored in the authority party server to create a MAC for the authorization parameter stored in the authority party server, and comparing the created MAC with the MAC that serves as the verification information, and determining that the verification information is authentic when the created MAC and the MAC that serves as the verification information are identical.

6. The method of claim 2, wherein the hardware security module is one of an external portable device removably connected to the portable electronic device, and a built-in module embedded in the portable electronic device.

7. A method for identity authentication to be implemented by a portable electronic device, an identification device, and an authentication server communicating with the portable electronic device and the identification device, the authentication server including a commercial platform and an authority party server, the portable electronic device being associated with a plurality of digital identifications that correspond with a plurality of identity documents, respectively, the method comprising steps of:

dynamically generating, by the commercial platform, a barcode encoding verification information and identification information that is associated with an identity of a user of the portable electronic device, the identification information being pre-stored in the authority party server, wherein the commercial platform extracts at least a part of data of a selected one of the digital identifications to serve as the identification information based on a user selection of a selected one of the digital identifications, and generates the barcode data based on the identification information and the verification information stored in the authority party server;

scanning, by the identification device, the barcode displayed on the display of the portable electronic device;

generating, by the identification device, an authentication command based on the barcode;

transmitting, by the identification device, the authentication command to the commercial platform;

extracting, by the commercial platform, the verification information and identification information from the authentication command;

determining, by the commercial platform, whether the verification information is authentic;

when the verification information is determined to be authentic, authenticating, by the authority party server, the identification information; and transmitting, by the authentication server to the identification device, an authentication result of the step of authenticating the identification information.

8. A method for identity authentication to be implemented by a portable electronic device, an identification device, and an authentication server communicating with the portable electronic device and the identification device, the authentication server including a commercial platform and an authority party server, the portable electronic device being associated with a plurality of digital identifications that correspond with a plurality of identity documents, respectively, the method comprising steps of:

dynamically generating, by the authority party server, a barcode encoding verification information and identification information that is associated with an identity of a user of the portable electronic device, the identification information being pre-stored in the authority party server, wherein the authority party server extracts at least a part of data of a selected one of the digital identifications to serve as the identification information based on a user selection of a selected one of the digital identifications, and generates the barcode data based on the identification information and the verification information stored therein;

scanning, by the identification device, the barcode displayed on the display of the portable electronic device;

generating, by the identification device, an authentication command based on the barcode;

transmitting, by the identification device, the authentication command to the commercial platform;

extracting, by the commercial platform, the verification information and identification information from the authentication command;

determining, by the authority party server, whether the verification information is authentic;

when the verification information is determined to be authentic, authenticating, by the authority party server, the identification information; and transmitting, by the authentication server to the identification device, an authentication result of the step of authenticating the identification information.

9. An authentication server comprising:

a commercial platform for communicating with a portable electronic device and an identification device; and an authority party server communicating with said commercial platform;

wherein said commercial platform is programmed to
dynamically generate a barcode, the barcode encoding verification information and identification information that is associated with an identity of a user of the portable electronic device, wherein the identification information is stored in the authority party server, and is associated with a user selection of a selected one of a plurality of identity documents of a user, transmit the barcode to the portable electronic device so as to enable the portable electronic device to display the barcode, receive, from the identification device, an authentication command, the identification device scanning the barcode displayed by the portable electronic device and generating the authentication command based on the barcode, extract the verification information and identification information from the authentication command, determine whether the verification information is authentic, and transmit the identification information to said authority party server when the verification information is determined to be authentic, wherein, said authority party server is programmed to, upon receipt of the identification information, authenticate the identification information, and transmit an authentication result of authenticating the identification information to the identification device.

10. An authentication server comprising:

a commercial platform for communicating with a portable electronic device and an identification device; and an authority party server communicating with said commercial platform;

wherein said authority party server is programmed to
dynamically generate a barcode, the barcode encoding verification information and identification information that is associated with an identity of a user of the portable electronic device, wherein the identification information is stored in the authority party server, and is associated with a user selection of a selected one of a plurality of identity documents of a user, transmit the barcode to the portable electronic device so as to enable the portable electronic device to display the barcode, receive, from said commercial platform, an authentication command, the identification device scanning the barcode displayed by the portable electronic device, generating the authentication command based on the barcode and transmitting the authentication command to said commercial platform, extract the verification information and identification information from the authentication command, determine whether the verification information is authentic, and when the verification information is determined to be authentic, authenticate the identification information, and transmit an authentication result of authenticating the identification information to the identification device via said commercial platform.

* * * * *